(12) United States Patent
Lombard et al.

(10) Patent No.: US 8,965,585 B2
(45) Date of Patent: *Feb. 24, 2015

(54) HVAC CONTROLLER WITH DEVICE SCHEDULING PROGRAM

(75) Inventors: Stuart Lombard, Toronto (CA); Mark Machiondo, Mississauga (CA); Hesham Ezzat Fahmy, Mississauga (CA); Erlend Sobec, Woodbridge (CA)

(73) Assignee: ecobee inc., Toronto (CA)

( * ) Notice: Subject to any disclaimer, the term of this patent is extended or adjusted under 35 U.S.C. 154(b) by 405 days.

This patent is subject to a terminal disclaimer.

(21) Appl. No.: 13/347,105

(22) Filed: Jan. 10, 2012

(65) Prior Publication Data

US 2013/0178986 A1 Jul. 11, 2013

(51) Int. Cl.
G05D 23/19 (2006.01)

(52) U.S. Cl.
USPC .......................................... 700/276; 700/295

(58) Field of Classification Search
None
See application file for complete search history.

(56) References Cited

U.S. PATENT DOCUMENTS

| | | | |
|---|---|---|---|
| 6,920,148 B1* | 7/2005 | Kato | 370/442 |
| 8,560,133 B2* | 10/2013 | Venkatakrishnan et al. | 700/291 |
| 2005/0119733 A1* | 6/2005 | Wiliams et al. | 623/1.49 |
| 2005/0119793 A1* | 6/2005 | Amundson et al. | 700/276 |
| 2007/0043477 A1* | 2/2007 | Ehlers et al. | 700/276 |
| 2010/0106333 A1* | 4/2010 | Grohman et al. | 700/278 |
| 2011/0270452 A1* | 11/2011 | Lu et al. | 700/291 |
| 2012/0048955 A1* | 3/2012 | Lin et al. | 236/46 R |

* cited by examiner

*Primary Examiner* — Ryan Jarrett
*Assistant Examiner* — Md N Mia
(74) *Attorney, Agent, or Firm* — Perry + Currier Inc.

(57) ABSTRACT

A controller is provided for HVAC equipment. The controller has a processor, memory, and a RF module for a home automation network, and is operable to regulate operation of the HVAC equipment based upon a scheduling program stored in memory. The scheduling program includes at least one usage periods and at least one set point associated with each usage period. The controller is also operable to regulate operation of remote electrical devices over the home automation network; and to create a device scheduling program for the remote electrical devices, the device scheduling program including at least one device period and an operational state associated with each device period.

15 Claims, 11 Drawing Sheets

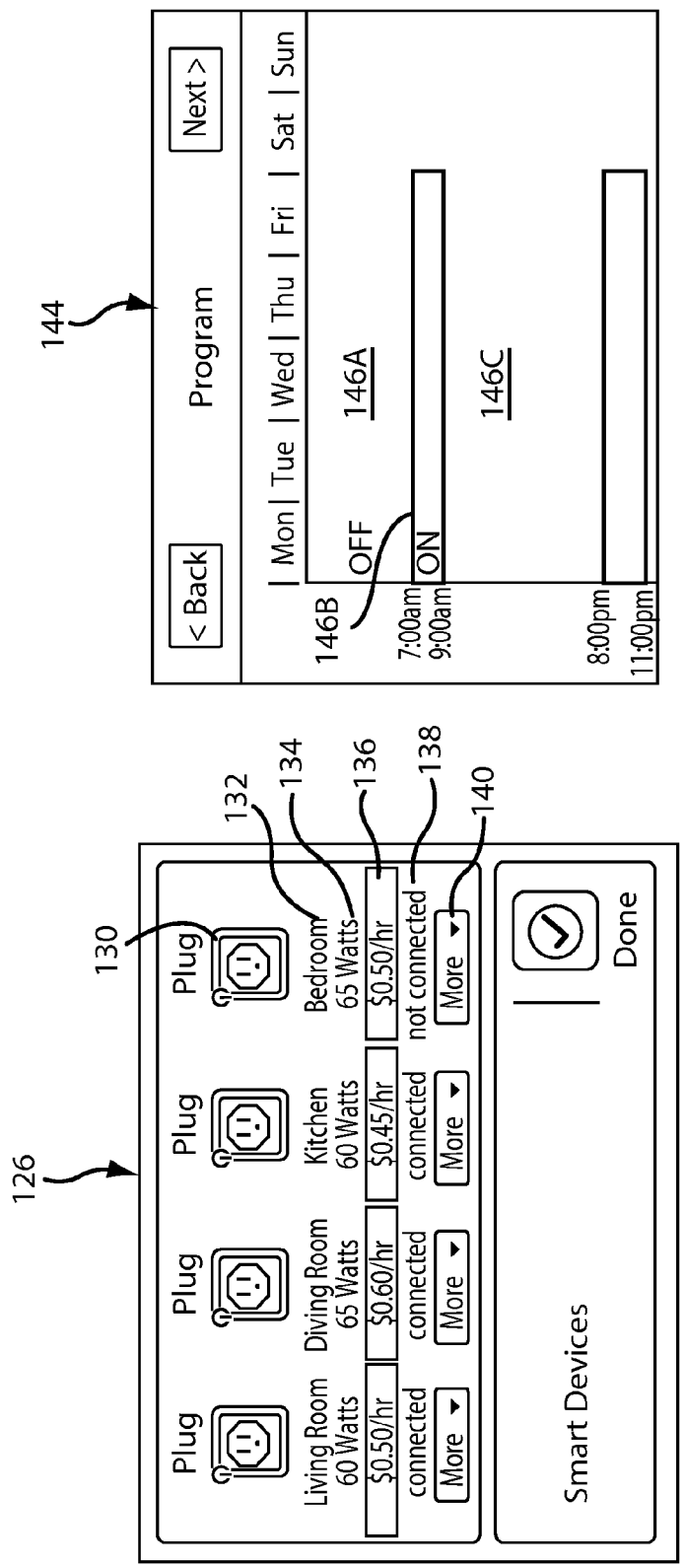

Figure 8A

Select the plugs you wish to program.
- Living Room Light — Yes / No
- Master Bedroom — Yes / No
- Hallway — Yes / No
- Front Porch — Yes / No Programming Wizard
Step 1 of
Back | Next

Figure 8B

Select how you want to program these plugs.
- Follow Thermostat schedule
- Program on/off times Programming Wizard
Step 3 of
Back | Next

Figure 8C

Select the plugs you wish to program.
- Awake — On / Off
- Away — On / Off
- Home — On / Off
- Sleep — On / Off Follow Thermostat schedule
Step 4 of
Back | Next

Figure 8D

Select the days of week you wish to program
Mon | Tue | Wed | Thu | Fri
Sat | Sun Programming Wizard
Step 2 of
Back | Next

Figure 8E

Program the on and off time for these plugs.
The device is OFF from the previous day.
- at 9:00 am > Delete
- at 11:15 am > Delete
- at 8:30 am > Delete
- Add On-Off schedule
Step 4 of
Back | Next

Figure 8F

Program
< Back | Next >
| Mon | Tue | Wed | Thu | Fri | Sat | Sun
OFF
ON
7:00am
9:00am
8:00pm
11:00pm

| Program | Mon | Tue | Wed | Thu | Fri | Sat | Sun | |
|---|---|---|---|---|---|---|---|---|
| | | | | | | | | ?⚠⊗ |
| 12 AM | | | | | | | | ← 114D-1 |
| 2 AM | | | | | | | | } 122 |
| 4 AM | | | | | | | | |
| 6 AM | ----114A---- | | | | | | | } 124 |
| 8 AM | ----114B-1---- | | | | ----114C-1---- | | | |
| 10 AM | ----114B-2---- | | | | ----114C-2---- | | | } 125 |
| NOON | | | | | | | | |
| 2 PM | | | | | | | | |
| 4 PM | | | | | | | | |
| 6 PM | ----114C-3---- | | | | | | | ← 120 |
| 8 PM | ----114C-4---- | | | | | | | } 124 |
| 10 PM | | | | | | | | ← 114D-2 |

Figure 10

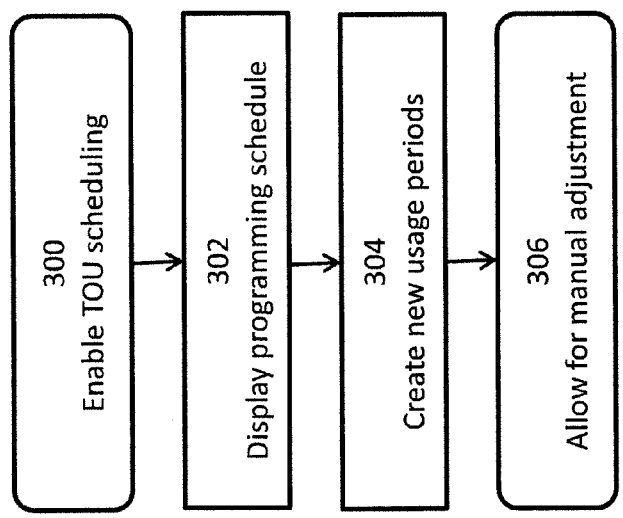

US 8,965,585 B2

HVAC CONTROLLER WITH DEVICE SCHEDULING PROGRAM

FIELD OF USE

The present invention relates to HVAC equipment. More specifically, the present invention relates to a scheduler for the HVAC equipment and remote electrical devices.

SUMMARY

According to an embodiment of the invention, there is provided a controller for operating HVAC equipment on a premise, the controller having a processor, memory, and a RF module for communication with a home automation network, wherein the controller being adapted to regulate operation of the HVAC equipment based upon a scheduling program created by a user and stored in memory, the scheduling program including at least one usage period and at least one set point associated with each usage period;

the controller being adapted to regulate operation of at least one electrical device over the home automation network; and the controller being further adapted to create a device scheduling program for each electrical device of the at least one electrical devices, the device scheduling program including at least one device period and an operational state associated with each at least one device period.

According to another embodiment of the invention, there is provided a controller for operating HVAC equipment on a premise, the controller having a processor, memory, and a RF module for communication with a home automation network, the controller being adapted to regulate operation of the HVAC equipment based upon a scheduling program created by a user and stored in memory, the scheduling program including at least one usage period and at least one set point associated with each usage period;

the controller being adapted to regulate operation of at least one electrical device over the home automation network; and the controller being adapted to create a device scheduling program for each electrical device of the at least one electrical devices, the device scheduling program including at least one device period and an operational state associated with each at least one device period; and wherein the controller prompts the user to select between a linked schedule for each electrical device of the at least one electrical device so that the at least one device period of the device scheduling program automatically correspond to the at least one usage period of the scheduling program, and an unlinked schedule for each electrical device of the at least one electrical device.

BRIEF DESCRIPTION OF THE DRAWINGS

Embodiments will now be described by way of example only, with reference to the following drawings in which:

FIG. 6 shows a Plugs application for the controller of FIGS. 1-3, as displayed on the controller;

FIG. 7 shows a device scheduling program for electrical devices for the controller of FIGS. 1-3;

FIGS. 8A-8F show a programming wizard for the device scheduling program for electrical devices shown in FIG. 7;

FIG. 10 shows a scheduling program for the controller of FIGS. 1-3, the scheduling program being displayed on the controller and the more device, and including time-of-use pricing scheduling;

FIG. 13 is a flowchart for a method of implementing Time of Use Pricing for a scheduling program.

DETAILED DESCRIPTION

Figure 1:
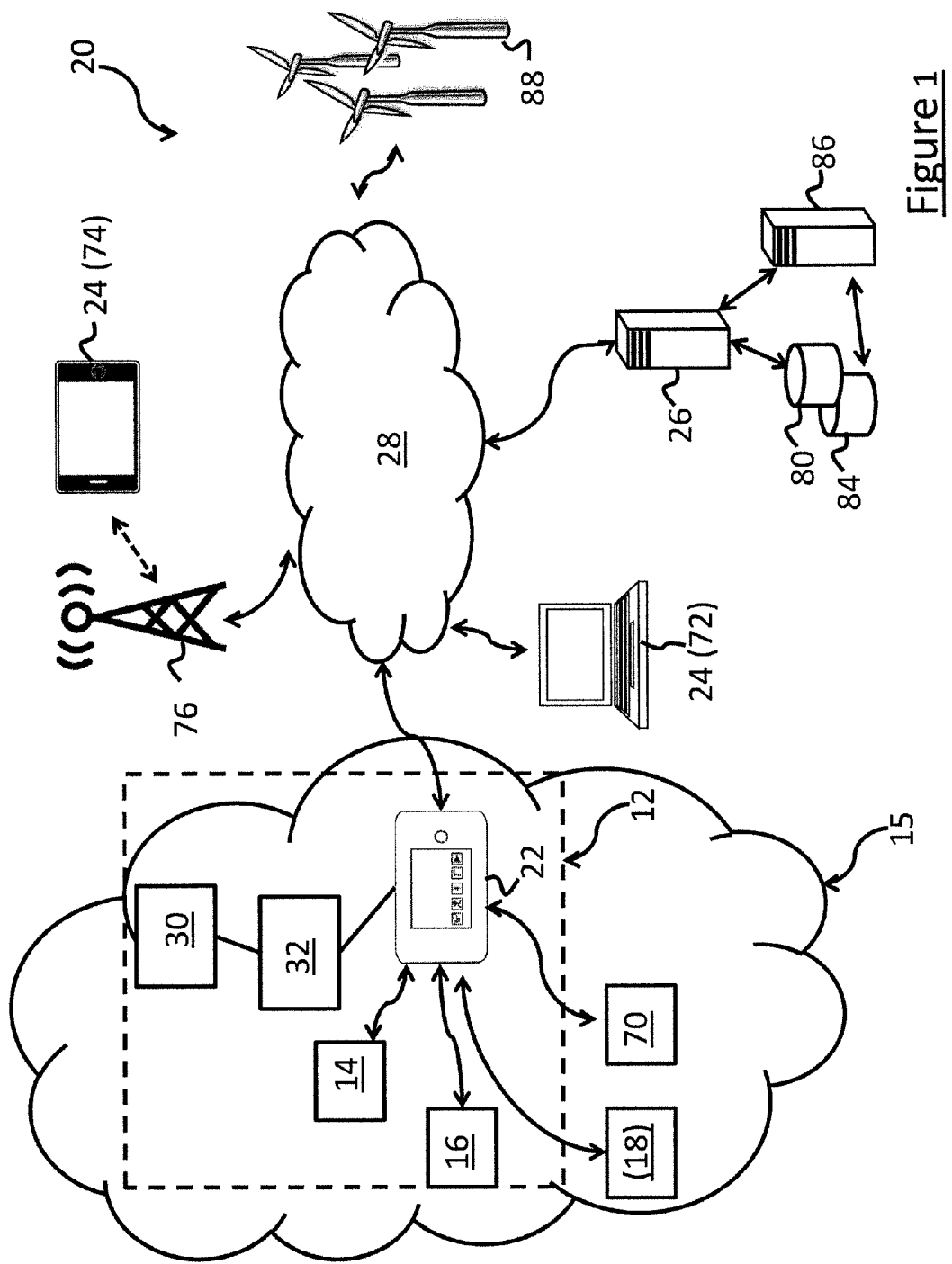
FIG. 1 is a schematic illustrating an embodiment of an integrated climate control system (ICECS) comprising an environmental web server, a controller for HVAC equipment and one or more remote devices, all communicatively coupled via a network.

Referring now to FIG. 1, a premise is shown generally at 12. Climate control for premise 12 is provided by an integrated climate and energy control system (ICECS) 20. ICECS 20 includes a controller 22 located within the premise. In addition, ICECS 20 can include at least one remote device 24, and an environmental web service 26, which are both in periodic communication with controller 22 via a network 28. Network 28 can include different, interconnected networks such as a private network (often a pr ivate Wi-Fi network) in communication with the public Internet.

Controller 22 is adapted to control HVAC equipment 30 as well as other electrical devices 14, which are typically also located within or proximate to premise 12, and described in greater detail below. Controller 22 is often colloquially referred to as a 'smart thermostat', but of course may also regulate HVAC functions other than temperature. HVAC equipment 30 can include furnaces, air conditioning systems, fans, heat pumps, humidification/dehumidification systems and the like. Controller 22 can be connected to HVAC equipment 30 using a hard-line connection (such as a 4-wire connector), a wireless connection, or a combination of the two. In some configurations, an equipment interface module (EIM) 32 can be provided as an interface between the controller 22 and HVAC equipment 30. The EIM 32 receives commands from the controller 22 across the hard-line or wireless connection, and then activates or deactivates the appropriate relays required to control the HVAC equipment 30. In addition, the EIM 32 includes detectors operable to monitor the operational status of HVAC equipment and transmit error codes and conditions back to controller 22.

Electrical devices 14 include any number of electricity-consuming devices that are directly controlled by controller 22 or are connected to controller 22 via a network plug 16. Network plugs 16 either plug directly into standard electrical outlets (not shown) within premise 12 or replace standard electrical outlets entirely. Electrical devices 14 and/or network plugs 16 communicate directly with controller 22 via a home automation network 15 (such as ZigBee HA), and can be provided with current sensors and/or controllers to measure real-time electrical consumption of the attached device. Furthermore, network plugs 16 can regulate electrical consumption in an attached device, typically in a binary ON/Off fashion.

Other types of electrical devices 14 can include an energy measurement device 18. Examples of energy measurement devices 18 include smart utility meters or current transducers (CT) that are connected to the main circuit of an electrical panel (not shown) in premise 12. The CT would be operable to measure the actual total electricity consumed at the premises, independent of a meter. The CT would further be operable to transmit the consumption wirelessly to controller 22 through the HAN 15. In some cases, a premise 12 could be equipped with multiple HANS 15, each operating according to its own frequencies and/or protocols (such as ZigBee HA and ZigBee SE)

Figure 2:
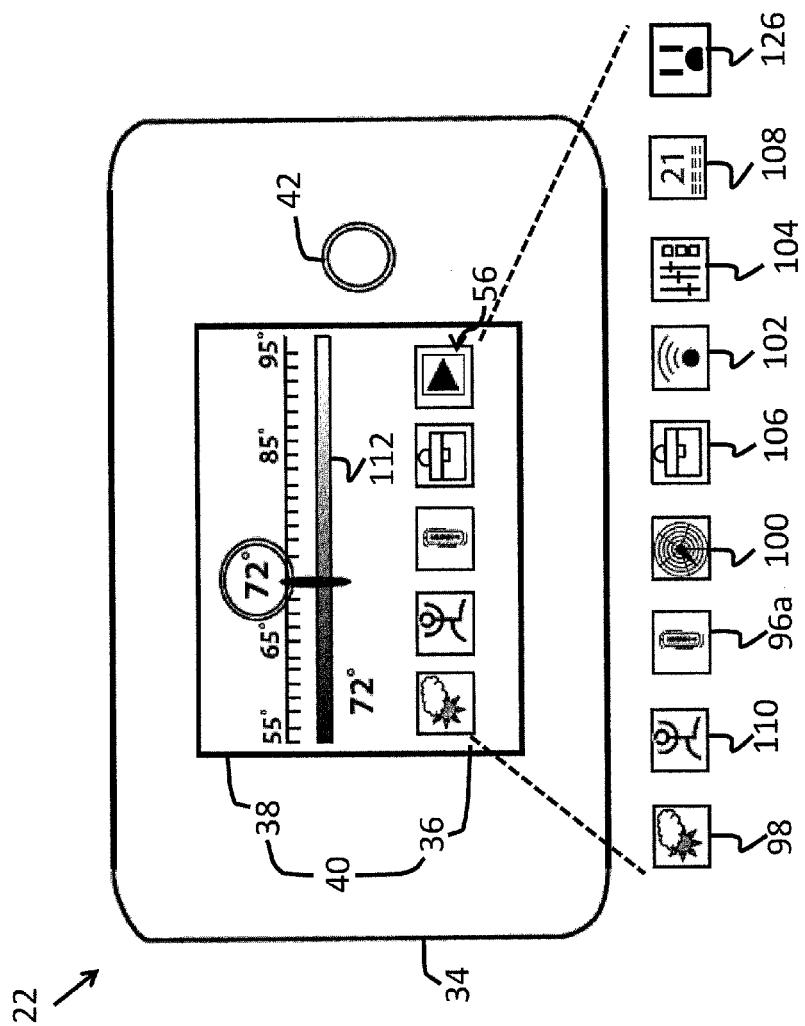
FIG. 2 is a front plan view of the controller shown in FIG. 1, and illustrates some of the external features, screen display and programs executable on the controller.

Referring now to FIG. 2, controller 22 is described in greater detail. Controller 22 includes a housing 34, which in the presently-illustrated embodiment, includes vents to allow airflow within the housing. Controller 22 also includes at least one input 36 adapted to receive user commands and an output 38 that is adapted for displaying environmental, operational, historical and programming information related to the operation of HVAC equipment 30. Input 36 can include fixed-function hard keys, programmable soft-keys, or programmable touch-screen keys, or any combination thereof. Output 38 can include any sort of display such as a LED or LCD screen, including segmented screens. In the currently-illustrated embodiment, the output 38 is a colour LCD screen having varying levels of brightness. Of course, input 36 and output 38 can be combined as a touch-screen display 40. The sensing technologies used by touch-screen display 40 may include capacitive sensing, resistive sensing, surface acoustic wave sensing, pressure sensing, optical sensing, and the like. In the presently-illustrated embodiment, controller 22 includes a 3.5" TFT touch screen display 40 using resistive sensing, which provides the functionality for both input 36 and output 38. In addition, controller 22 includes a hard key 42 (i.e., the "home" button) as an additional input 36 option.

Figure 3:
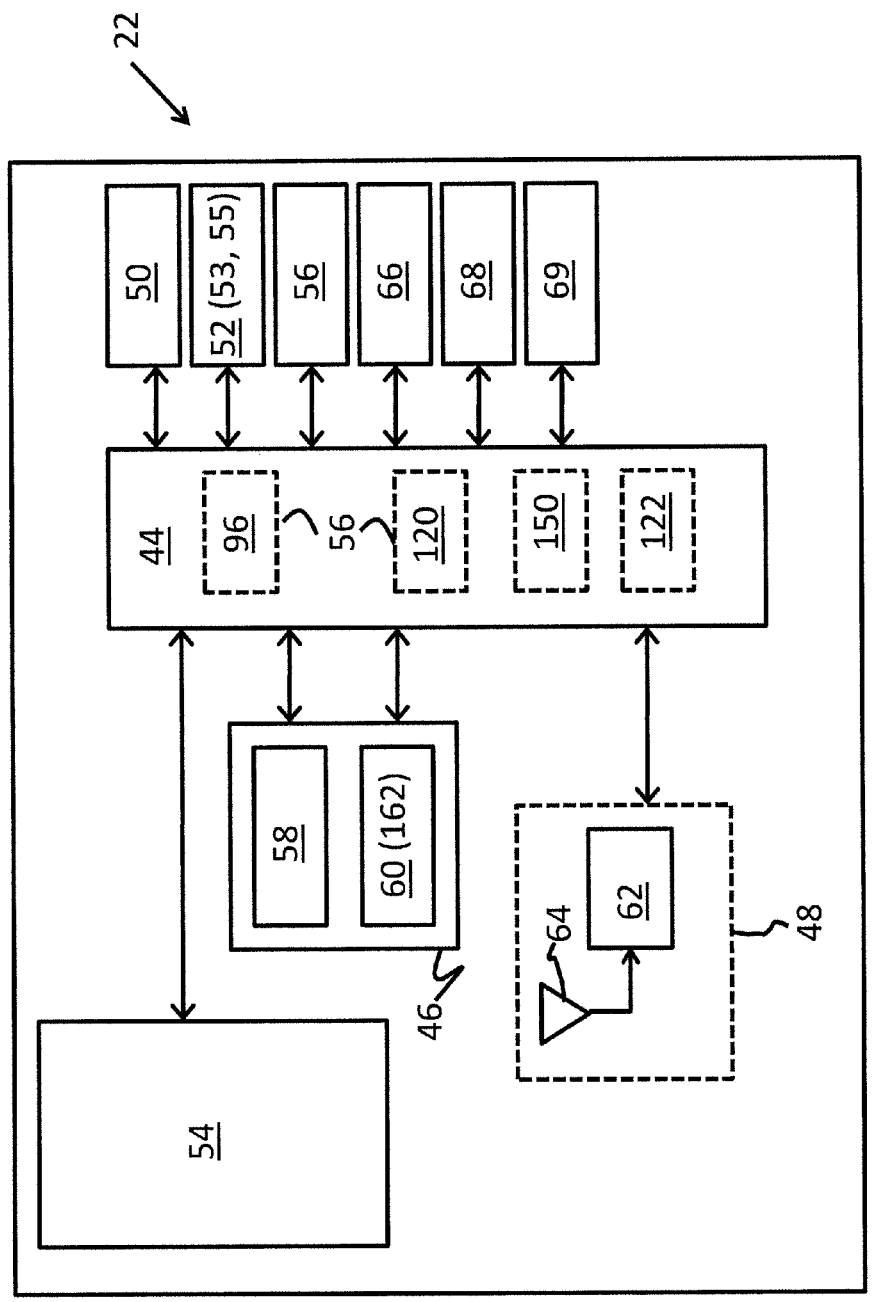
FIG. 3 is a schematic illustrating an electronic architecture of the controller shown in FIG. 1.

Referring now to FIG. 3, the internal components of controller 22 are shown in greater detail. In the presently-illustrated embodiment, controller 22 includes a processor 44, memory 46, a radio frequency (RF) subsystem 48, I/O interface 50, power source 52 and environmental sensor(s) 54.

Processor 44 is adapted to run various applications 56, many of which are displayed on touch screen display 40 (FIG. 2) on controller 22. Details on applications 56 are provided in greater detail below. In presently-illustrated embodiment, processor 44 is a system on a chip (SOC) running on an ARM processor. Processor 44 can include additional integrated functionality such as integrating a touch-screen controller or other controller functions. Those of skill in the art will recognize that other processor types can be used for processor 44. Memory 46 includes both volatile memory storage 58 and non-volatile memory storage 60 and is used by processor 44 to run environmental programming (such as applications 56), communications and store operation and configuration data. In the presently-illustrated embodiment, the volatile memory storage 58 uses SDRAM and the non-volatile memory storage 60 uses flash memory. Stored data can include programming information for controller 22 as well as historical usage data, as will be described in greater detail below. Other types of memory 46 and other uses for memory 46 will occur to those of skill in the art.

RF subsystem 48 includes a Wi-Fi chip 62 operably connected to a Wi-Fi antenna 64. In the presently-illustrated embodiment, Wi-Fi chip 62 support 802.11 b/ communication to a router within range that is connected to network 28. As currently-illustrated, Wi-Fi chip 62 supports encryption services such as WPA, WPA2 and WEP. Other networking protocols such as 802.11a or n, or 802.16 (WiLan), as well as other encryption protocols are within the scope of the invention. RF subsystem 48 can further include other wireless communication subsystems and controllers, such as cellular communication subsystems, and/or home automation networks based upon Bluetooth networking, Zigbee networking, such as Zigbee Home Automation (HA) or Smart Energy (SE), ERT or IR networking. It is contemplated that RF subsystem 48 can include multiple radios, antennas and/or chipsets to support multiple protocols such as concurrent support of both Zigbee HA and Zigbee SE.

I/O interface 50 provides the physical connectors for controller 22. For example, I/O interface 50 may include the connectors for a 4-wire connection to HVAC equipment 30 (FIG. 1). I/O interface can also include a debug port, a serial port, DB9 pin connector, a USB or microUSB port, or other suitable connections that will occur to those of skill in the art. Power source 52 provides electrical power for the operation of controller 22 and can include both wire-line power supplies and battery power supplies. In the presently-illustrated embodiment, the four-wire connection to I/O ports 50 can also provide the necessary power for controller 22, as well as any necessary surge protection or current limiters. Power source 52 can also include a battery-based back-up power system. In addition, power source 52 may provide a power connection jack which allows the controller 22 to be powered on without being connected to the 4 wire connection, or relying upon battery backup. In the presently-illustrated embodiment, power source 52 further includes a current sensor 53 that is operable to measure the current draw of power source 52. Also in the presently-illustrated embodiment, power source 52 includes a voltage sensor 55 that is operable to measure the voltage at power source 52.

In addition, controller 22 can include one or more expansion slots or sockets 66. The expansion slot/socket 66 is adaptable to receive additional hardware modules to expand the capabilities of controller 22. Examples of additional hardware modules include memory expansion modules, remote sensor modules, home automation modules (to communicate with the electrical devices 14 over the HAN 15 via Zigbee HA or other such protocol), smart meter modules (to communicate over the HAN 15 with the energy measurement device 18), etc. The expansion slot/socket 66 could include an additional RF component such as a Zigbee® or Zwave™ module. The home automation module would allow capabilities such as remote control of floor diffusers, window blinds, etc. The combination of remote sensing and remote control would serve as an application for Zoning temperature Zone control.

Environmental sensor(s) 54 is adapted to provide temperature and humidity measurements to the processor 44. In the presently-illustrated embodiment, environmental sensor 54 is an integrated component, but could also be separate thermistors and hydrometers. It is contemplated that environmental sensor 54 could include additional sensing capabilities such as carbon-monoxide, air pressure, smoke detectors or air flow sensors. Other sensing capabilities for environmental sensor 54 will occur to those of skill in the art. The environmental sensor 54 may be built near vents located near the "bottom" of housing 34 (relative to when controller 22 is mounted on a wall) so as to minimize the effects of waste heat generated by the hardware of controller 22 upon environmental sensor 54.

Controller 22 can include additional features, such as an audio subsystem 68. The audio subsystem 68 can be used to generate audible alerts and input feedback. Depending on the desired features, audio subsystem 68 can be adapted to synthesize sounds or to play pre-recorded audio files stored in memory 46.

Another additional feature for controller 22 is a mechanical reset switch 69. In the presently-illustrated embodiment, mechanical reset switch 69 is a microswitch that when depressed either restarts the controller 22 or reinitializes the controller 22 back to its original factory condition.

Controller 22 may be operable to communicate with one or more remote sensors 70 that are distributed around the inside and/or the outside of premise 12. Remote sensors 70 are operable to provide remote sensor data for temperature, humidity, air flow, HVAC system monitoring (such as discharge and return air) and/or $CO_2$. Within premise 12, multiple remote sensors $70_{inside}$ are typically used to provide zone control, or averaged space temperature across multiple remote sensors 70. A remote sensor $70_{outside}$ located outside the premise is used to provide weather information. In particular, remote sensor $70_{outside}$ can provide local outdoor temperature, humidity, air pressure and/or air flow measurements, which can be used as inputs in the control algorithms of ECP 96 (described in greater detail below). Remote sensors 70 can also be used to monitor non-HVAC devices such as fridges or freezers. Remote sensors 70 can also include I/O modules that convert hardwired dry contact inputs to wireless signals that are sent back to controller 22, or conversely takes ON/OFF signals from the controller and transmits them wirelessly to this module. This module can then turn ON/OFF device locally to the module, in the manner described above with reference to smart plugs 16. Inputs for these remote sensors 70 can include flood sensors, door/window sensors, motion or other occupancy sensors, alarm system relays or KYZ pulse counter. Outputs for these remote sensors 70 can include Occupancy switches for lighting systems, HVAC Economizers, other HVAC switches, non-plug form factor loads (pool pumps, water tanks), etc.

Figure 4:
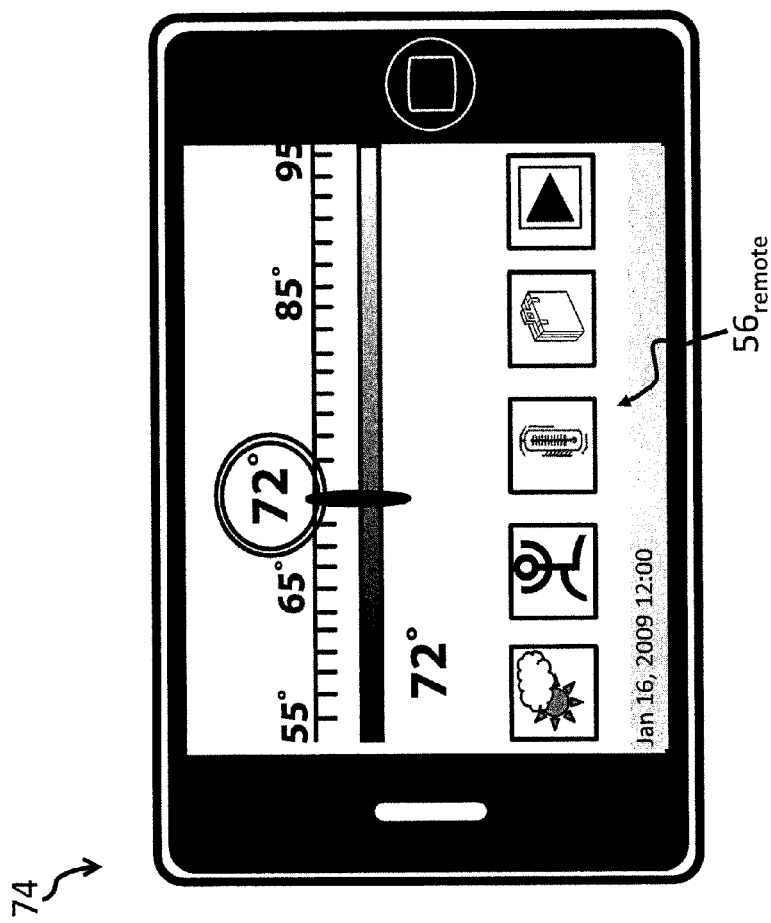
FIG. 4 is a front plan view of one of the remote devices shown in FIG. 1, the remote device having a replica screen of the screen display of the environmental control device illustrated in FIG. 2.

Referring back to FIG. 1, other components of ICECS 20 are described in greater detail. The remote device 24 is adapted to be located remote from the controller 22 and can include either or both of: a personal computer 72 (including both laptops and desktop computers), and a mobile device 74 such as a smart phone, tablet or Personal Digital Assistant (PDA). The remote device 24 and more typically the mobile device 74 may be able to connect to the network 28 over a cellular network 76. As can be seen in FIG. 4, remote device 24 includes one or more remote applications $56_{remote}$. As will be described in greater detail below, the remote applications $56_{remote}$ are akin to the applications 56 found on controller 22, and generally provide similar functionality. However, remote applications $56_{remote}$ may be reformatted to account for the particular display and input characteristics found on that particular remote device 24. For example, a mobile device 74 may have a smaller touch screen than is found on controller 22. It is also contemplated that remote applications $56_{remote}$ may have greater or reduced functionality in comparison to their counterparts, applications 56.

The remote device 24, and most typically the personal computer 72 may connect to network 28 using either a wireline connection or a wireless connection, for example. The personal computer 72 can be loaded with an appropriate browsing application for accessing and browsing the environmental web service 26 via network 28. Personal computer 72 is operable to run one or more PC applications $56_{PC}$ (not illustrated), which can include web-based applications. As will be described in greater detail below, the PC applications $56_{PC}$ are akin to the applications 56 found on controller 22, and generally provide similar functionality. However, PC applications $56_{PC}$ are reformatted to account for the particular display and input characteristics found on personal computer 72. For example, a personal computer 72 may have a larger screen, and a mouse or touchpad input. It is also contemplated that PC applications $56_{PC}$ may have greater or reduced functionality in comparison to their counterparts, applications 56.

The environmental web service 26 may be owned by a separate organization or enterprise and provides web portal application for registered users (typically the owners of controllers 22). Environmental web service 26 acts as a web server and is able to determine and deliver relevant content to controllers 22 and to remote devices 24 (i.e., personal computers 62 and mobile devices 64). For example, environmental web service 26 may deliver applications 56, $56_{remote}$ and $56_{PC}$ to any accessing device using the appropriate Internet protocols. In effect, environmental web service 26 allows the controller 22 to communicate with remote devices 24. Environmental web service 26 may also transfer data between its own content databases, controllers 22 and remote devices 24. Environmental web service 26 is further operable to enable remote or web-based management of controller 22 from a client using the aforementioned remote device 24. Environmental web service 26 provides the set of web widgets and that provides the user interface for users of remote devices 24. It is further contemplated that environmental web service 26 is operable to provide remote software updates to the applications 56 over network 28. Environmental web service 26 may further includes an energy modelling server 86 that is operable to query aggregate data warehouse 84 and customer account data 80 to provide energy modelling services for customers.

Another component of ICES 20 is electrical utility 88. Utility 88 provides electrical power to premise 12 through a transmission network (not depicted). As will be described in greater detail below, utility 88 is also able to transmit Time of Use (TOU) pricing information, critical peak power (CPP) and/or demand response (DR) events to controller 22. TOU pricing, CPP and DR events can be transmitted to controller 28 via environmental web service 26 through network 28. Alternatively, TOU pricing, CPP and DR events can be transmitted directly to an energy measurement device 18 via a cellular network or other means (not shown), where it can then be transmitted to controller 22 across the home automation network.

Controller 22, and in particular, in cooperation with the other components of ICECS 20, can provide climate control functionality beyond that of conventional thermostats through the running of applications 56 on controller 22 and/or the running of applications $56_{remote}$, $56_{PC}$, etc. on their respective remote devices 24. Referring back to FIGS. 2 and 3, some of applications 56 running on controller 22 will be briefly discussed. Applications 56 can include an environmental control program (ECP) 96, a weather program 98, an energy use program 100, a remote sensors program 102 and a Configuration program 104. Other programs will occur to those of skill in the art.

ECP 96 is operable to display and regulate environmental factors within a premise 12 such as temperature, humidity and fan control by transmitting control instructions to HVAC equipment 30. ECP 96 displays the measured current temperature and the current temperature set point on touch screen display 40. ECP 96 may also display the measured current humidity and/or humidity set point (not currently illustrated). Alternatively, ECP 96 may simply indicate when HVAC equipment 30 is actively providing humidification. ECP 96 may also include an ECP Details program 96a, which provides additional control over ECP 96. In addition, ECP 96 maintains historical record data of set points and measured values for temperature and humidity. These can be stored locally in memory 46, or transmitted across network 28 for storage by environmental web service 26 in aggregate data warehouse 84.

Figure 5B:
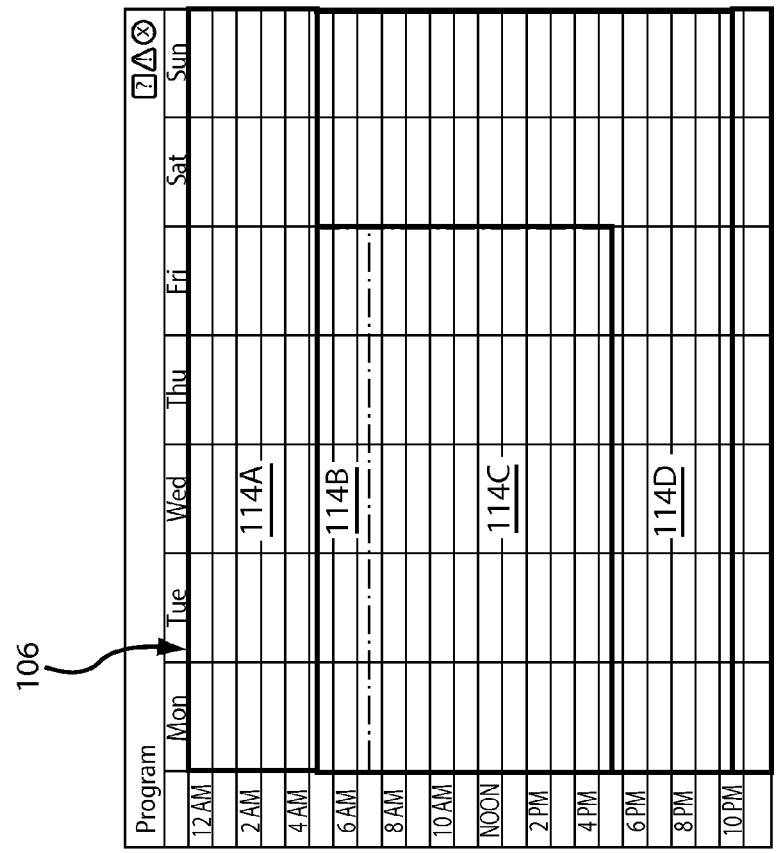
FIGS. 5A and 5B show a scheduling program for the controller of FIGS. 1-3, the scheduling program being displayed on the controller and the more device, respectively.
Figure 5A:
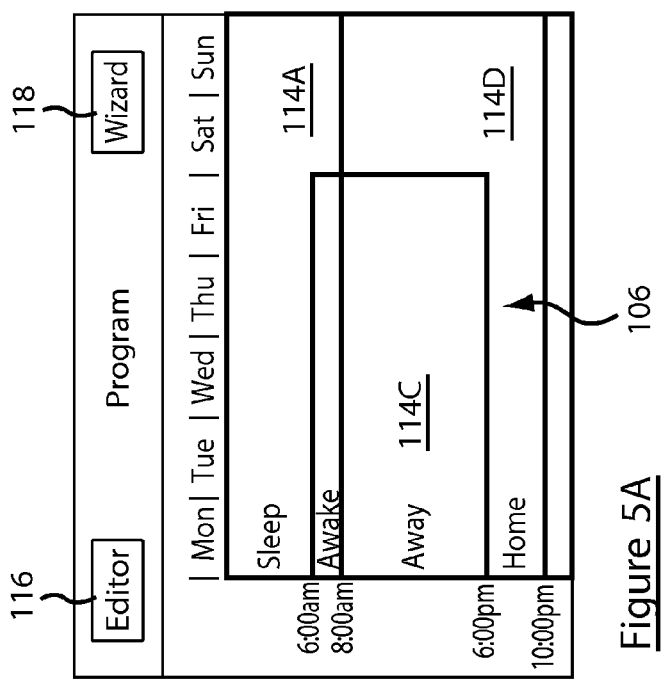

ECP 96 may be manipulated by a user in numerous ways including a Scheduling program 106, a Vacation Override program 108, a Quick Save override program 110 and a manual temperature adjustment through the manipulation of a temperature slider 112. As shown in FIG. 5, the Scheduling program 106 allows a user to customize the operation of HVAC equipment 30 according to a recurring weekly schedule. FIG. 5A shows an embodiment of Scheduling Program 106 as depicted on the controller 22. FIG. 5B shows an embodiment of the Scheduling Program 106 as depicted on a web page through personal computer 74 (FIG. 1). The weekly schedule allows the user to adjust set-points for different hours of the day that are typically organized into a number of different usage periods 114 such as, but not limited to, "Awake" (usage period 114A), "Away" (usage period 114B), "Home" (usage period 114C) and "Sleep" (usage period 114D). For most users, the usage periods 114 will be associated with their own personal behaviours. Thus, the Away period may have reduced cooling or heating as the users are at work/school, etc. Scheduling program 106 may include different programming modes such as an editor 116 and a wizard 118. Scheduling program 106 may also include direct manipulation of the weekly schedule through various touch gestures (including multi-touch gestures) on image of the schedule displayed on the touch screen display 40.

Weather program 98 (FIG. 2) is operable to provide a user with current and/or future weather conditions in their region. The icon for weather program 98 on the home screen of controller 22 indicates the current local external temperature and weather conditions. This information is provided from an external feed (provided via environmental web service 26), or alternatively, an outdoor remote temperature sensor 70 connected directly or indirectly to controller 22, or a combination of both an external feed and a remote temperature sensor. In the presently-illustrated embodiment, selecting the weather program 98 replaces the current information on touch screen display 40 with a long-term forecast (i.e., a 7 day forecast) showing the predicted weather for later times and dates. The information for the long term forecast is provided via environmental web service 26.

Energy use program 100 (FIG. 2) is a program that allows users to monitor and regulate their energy consumption (i.e., electricity use or fossil fuel use). Energy use program 100 can include a real-time display of energy use, regular reports (hourly, daily, weekly, etc.), and provide estimates of projected costs. As will be described in greater detail below, energy use program 100 may also allow a user to configure how their HVAC equipment 30 responds to different Demand-Response events issued by their utility. The energy use program 100 may require additional hardware components, such as a smart meter reader in expansion slot/socket 66, as well as smart plugs installed on the premise 12 (not shown). To view energy consumption across the entire premise 12, an energy measurement device 18 (such as a wireless or wired current transducer (CT) or a smart meter) must also be installed. Pricing information can be either manually entered, provided by the utility 88 over network 28, or directly from the smart meter. If pricing information is not available, then only consumption data will be reported. Without the necessary hardware components, the energy use program 100 may be either dimmed out or not present on the touch screen display 40.

Remote sensor program 102 allows users to view, configure and control remote sensors 70 that are distributed around the inside and/or outside of premise 12. Using the remote sensor program 102, a user can change the on-screen name of specific remote sensors 70, as well as view and control the averaging of any remote sensor 70. Remote sensor program 102 may also send alerts (onscreen, or to e-mail) for remote devices indicating a low battery condition, indicating that the device will require a battery replacement soon. In addition, a similar alert can be sent out if a device has been successfully connected, but the thermostat has lost communications to that device for a predetermined period of time, an alert should be generated to advise the user. When remote sensors 70 are not utilized, then the remote sensor program 102 may be either dimmed out or not present on the touch screen display 40.

Configuration program 104 (alternatively called "Settings") allows a user to configure many different aspects of their controller 22, including Wi-Fi settings, Reminders and Alerts, Installation Settings, display preferences, sound preferences, screen brightness and Password Protection. Users may also be able to adjust their own privacy settings, as well as configure details pertaining to their HVAC equipment 30, such as the type and manufacture of the furnace, air conditioning and/or humidification system. In addition, users of Configuration program 104 may be able to specify certain physical and environmental parameters of their premise 12, such as the size of premise 12, or the number of inhabitants of premise 12. Additionally, a user may be able to specify the type of construction and materials used for window panes 16, such as single or double paned, argon filled, etc. Other aspects of controller 22 that can be modified using the Configuration program 104 will occur to those of skill in the art.

Plugs program 126 allows users to configure many different aspects of their electrical devices 14 and smart plugs 16. When selected (FIG. 6), Plugs program 126 displays a Plug icon 130 for each connected smart plugs 16 (or other electrical devices 14), and shows whether the devices are ON or OFF. Underneath each Plug icon 130, is a device label 132, which can be customized by the user, a consumption value 134, which reports the real-time consumption of the attached device load, and an optional price value 136. When the controller 22 has access to utility pricing information from utility 88, the price value 136 represents the hourly cost of running the device at its current load. If the premise 12 is signed up for tiered pricing, the price value 136 can be colour coded to represent different pricing tiers (high, medium, low, etc.). Below the pricing value 136 is a connection status 138 which shows whether the electrical device 14 is presently connected to or disconnected from HAN 15.

Figure 11:
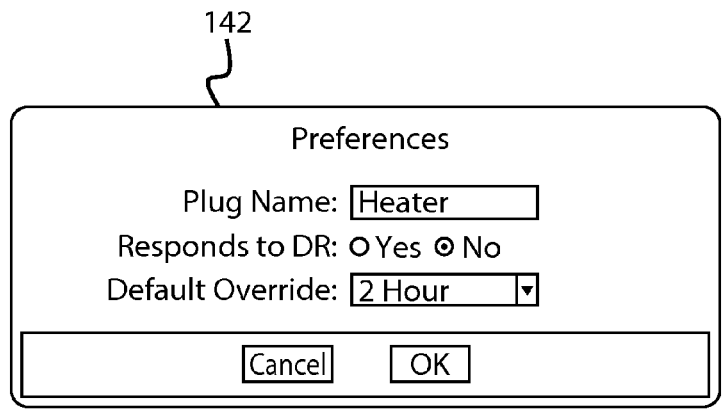
FIG. 11 shows a Preferences option for the Plugs application of FIG. 7.

Selecting the More icon 140, the user can access additional features. For example, the user can modify options in the Preferences menu 142. An example of the Preferences menu 142, formatted for a personal computer 72 is shown in FIG. 11. Other embodiments of the Preferences menu 142 may differ. Using the Preferences menu 142, a user can modify the name of a particular plug 16. Additionally, the user can modify the demand response behaviour for the selected electrical devices 14. (Alternatively, the user can modify the demand response behaviour for multiple electrical devices 14) By modifying the demand response behaviour for the selected electrical device 14, the user can determine whether that particular device 14 (or devices 14) will be included in any demand response event issued by utility 88 (via network 28, or through a smart meter or other energy measurement device 18). Typically, the user will be able to turn the electrical device 14 ON or Off. In the presently-illustrated embodiment, the Preferences menu 142 provides a Yes/NO toggle option for each registered smart plug 16, electrical device 14 and/or I/O module 70 in response to the issued DR event. Thus, a user may voluntarily deactivate electrical devices 14 during a DR event, overriding any normal electrical Device scheduling program 144 (described in greater detail below) for that device 14. However, other device behaviours could be specified. For example, the user may be able to select a duty cycle %, indicating the amount of ON time during the DR event. For example, if a duty cycle % of 30% is selected, then the device will be ON for 30% of the time period of the DR event.

Figure 12:
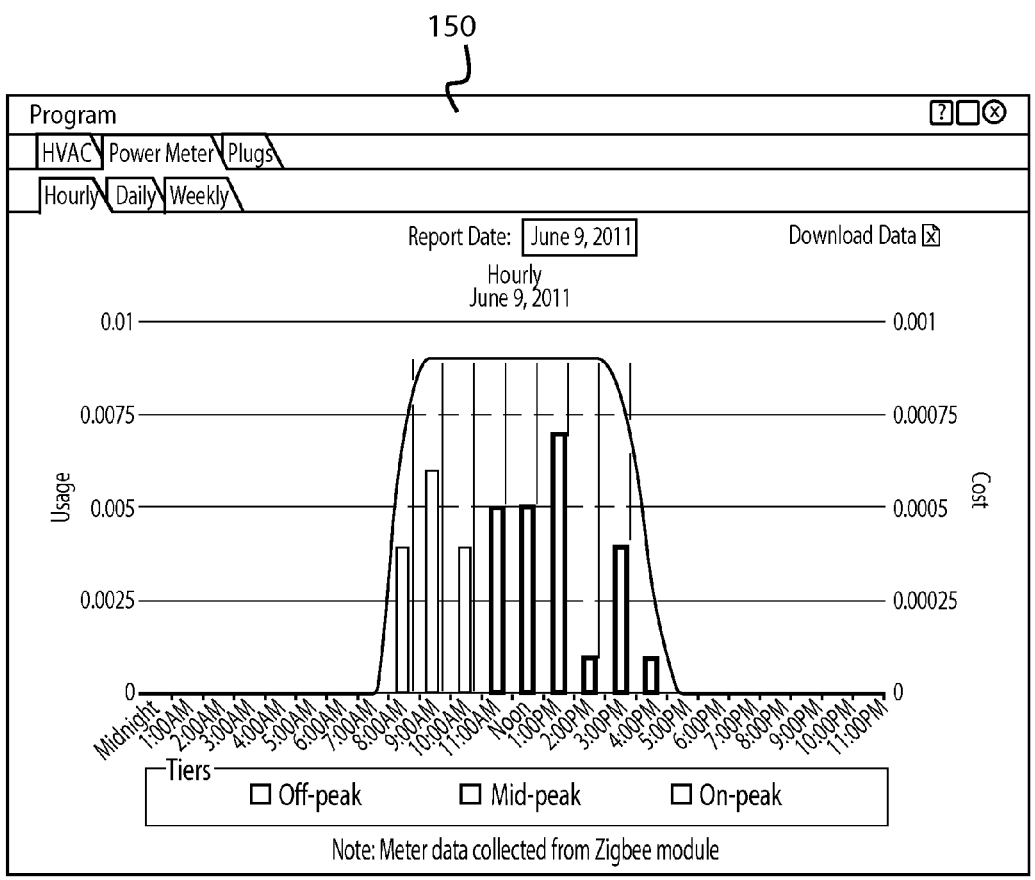
FIG. 12 shows a Reports program for the controller of FIGS. 1-3.

Using the More icon 140, the user can also access Reports program 150. Using Reports program 150, the user can also see graphical reports for that particular electrical device 14 in greater detail, such as hourly, daily, weekly or monthly reports of energy consumption or cost. FIG. 12 shows a sample report provided by Reports program 150 formatted for a personal computer 72.

Electrical devices 14 capable of joining the HAN 30, such as smart plugs 16, need to be connected to controller 22. In the presently-illustrated embodiment, devices can join HAN 30 in two ways. In the first way, upon power-up, the electrical device 14 automatically looks for a HAN 30 to join. Alternatively, the device could require that user actuate a manual switch before it begins to seek a HAN 30. Controller 22 may also include a Setup program that initiates a search for connectable electrical devices 14 to be joined to HAN 30.

As mentioned previously, it is contemplated that some electrical devices 14 connected to HAN 30 will follow a Device scheduling program 144 (FIG. 7) that corresponds to the usage periods of Scheduling program 106. For example, a home entertainment system connected to a smart plug (i.e., the electrical device 14) will be off during the Away usage period, and on (i.e., at least on standby power). In the currently-implemented embodiment, whenever it detects a new electrical device 14, the controller 22 will ask the user if it wants to use the same arrangement of usage periods as Scheduling program 106 (referred to as linked scheduling). If the user declines, the user can then manually define usage periods for scheduling program 144 (unlinked scheduling).

The Device scheduling program 144 includes one or more periods 146 (146A, 146B, etc.). However, rather than have a temperature setting, each device period 146 would typically have an operational state, such as OFF or ON (for electrical devices 14 that operate in a binary fashion). For electrical devices 14 which operate in a non-binary fashion, other operational states such as HIGHH/MEDIUM/LOW, or duty cycle percentages. Alternatively, electrical devices 14 could have temperature set point settings (for example, a pool heater).

As mentioned above, this Device scheduling program 144 can be unique to the individual electrical device 14, or can be linked to the HVAC schedule. In the current embodiment, the controller 22 prompts the user to select either linked scheduling or unlinked scheduling. When linked scheduling is selected, the Device scheduling program 144 is divided into device periods 146 that correspond to the usage periods 114 of the HVAC schedule in Scheduling program 106. For example, if Scheduling program 106 includes an "Awake" period from 7:00 AM to 9:00 AM on all weekdays, Device scheduling program 144 would create a device period 146B for 7:00 AM to 9:00 AM on all weekdays. The user would then define an operational state for the device period 146B as either ON or OFF. The user could subsequently define the operational state (ON or OFF) for each remaining device period 146B, 146C, etc. The time ranges for each device period 146 in Device scheduling program 144 would be updated automatically as the primary HVAC schedule was updated. Any overrides to the HVAC programming would carry over and be applied to the Device scheduling program 144 as well. As with the HVAC schedules, controller 22 may have separate device scheduling programs 144 that correspond to when the HVAC equipment 30 is in heat mode and in cool mode.

When Device scheduling program 144 is not linked to the HVAC schedule, each electrical device 14 can follow its own unique 7 day schedule, with its own periods that may or may not correspond to those of the HVAC schedule. When unlinked, each Device scheduling program 144 has its own independent overrides. Device scheduling program 144 may also usage link device periods 146 to sunrise or sunset. For example, an electrical device 14 such as an outdoor light might be switched to ON thirty minutes after sunset. Sunrise and sunset data could be retrieved from ECP 96 (or other remote source), or could be calculated using the controllers own internal clock and any latitude/longitude coordinates stored in its configuration file.

It is contemplated that the Vacation Override program 108 (FIG. 2) would also be able to override device scheduling program 144 during a vacation event. When a user creates a vacation event using the Vacation Override program 108, the currently-illustrated embodiment provides an Include electrical devices option. If this option is selected, the user will be able to program a unique Device scheduling program 144 for the chosen electrical device(s) 14 which will be in effect for the duration of the vacation event in a manner similar to the one described above. Once the event is over the electrical devices 14 will revert back to their regular Device scheduling program 144. If an electrical device 14 is not included in the Vacation Override program 108, it will follow its existing Device scheduling program 144. If that schedule is linked to the HVAC schedule, it will continue to follow the normal HVAC schedule during this vacation period. In addition, it is contemplated that device scheduling programs 144 may be overridden by a DR event. FIG. 11 illustrates a Preferences menu 142, where each device is configured to respond to DR events issued by a utility 88. It is contemplated that devices can be configured to respond to DR events by device period 146. For example, an electrical device 14 may be configured to respond to a DR event while it is in an "Away" device period 146, but not during an "Awake" device period 146.

Figure 9:
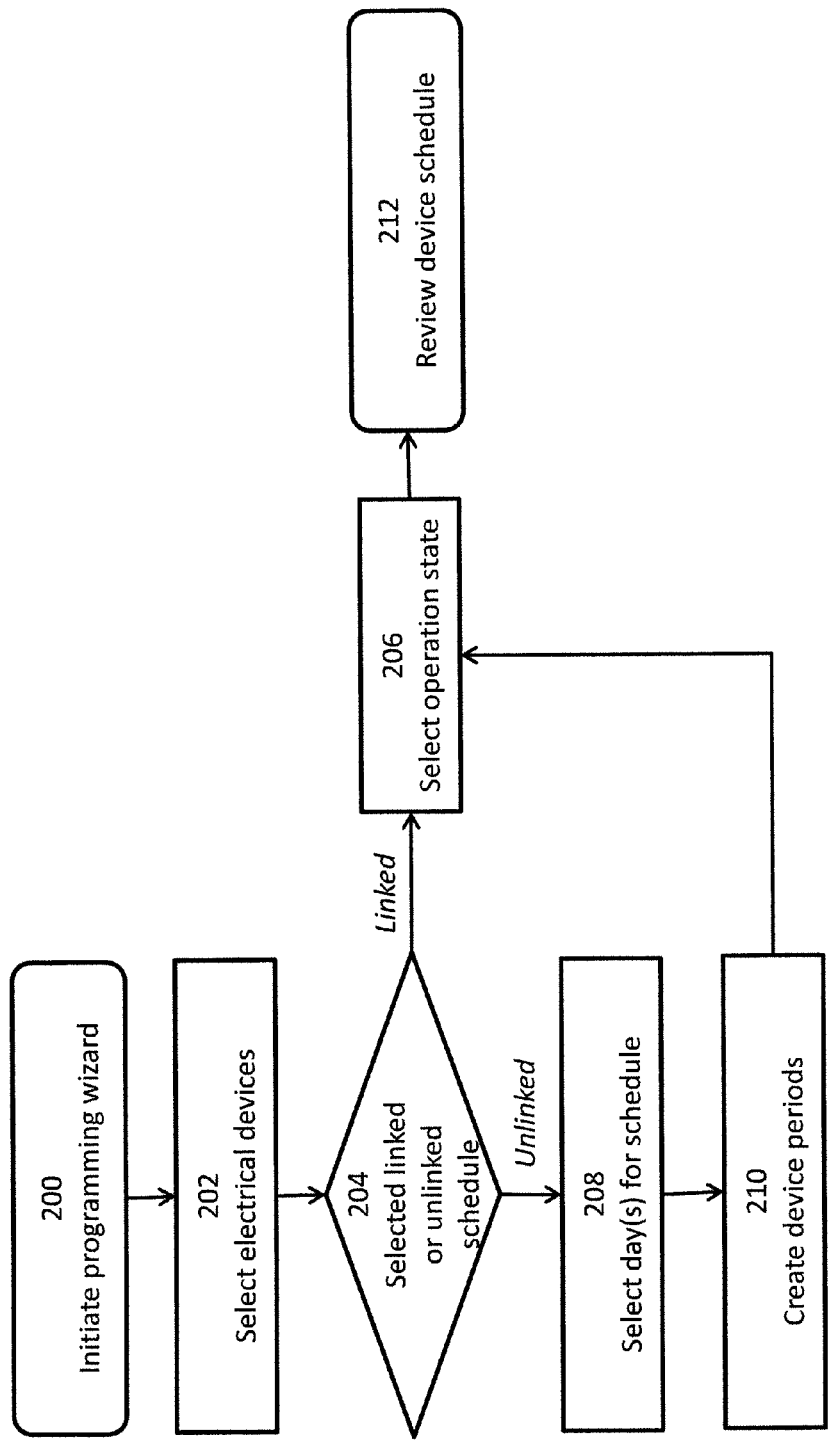
FIG. 9 is a flowchart for a method of programming electrical devices on the controller of FIGS. 1-3, using the programming wizard of FIGS. 8A-8F.

FIGS. 8A-8F show an example of a programming wizard for Device scheduling program 144 for multiple electrical devices 14, applicable to either linked or unlinked modes of operation. Furthermore, some electrical devices 14 can operate in linked mode, while other electrical devices 14 operate in unlinked mode. FIG. 9 is a flowchart of a method for programming a Device scheduling program 144 using the wizard interface shown in FIGS. 8A-8F. Beginning at step 200, a user initiates a programming wizard option using the Plugs program 126. Alternatively, the controller 22 prompts the user upon detection of a new electrical device 14 within HAN 30.

At step 202, the user selects which electrical devices (typically smart plugs 16) are to be programmed. FIG. 8A shows an exemplary UI screen for step 202, which uses a toggle mechanism for each smart plug 16. Once the user has selected the desired electrical devices 14, the user presses the Next icon. In the presently-illustrated embodiment, step 202 is skipped when the programming wizard is initiated automatically upon detection of a new electrical device 14 within HAN 30. Instead, only the newly-detected electrical device 14 is selected.

At step 204, the user selects whether the selected electrical devices 14 will be linked to the HVAC schedule, or will be unlinked. FIG. 8B shows an exemplary UI screen for step 204. If the selected electrical devices 14 are to be linked, the method advances to step 206; if the selected electrical devices 14 are to be unlinked, the method advances to step 208.

At step 206, the user selects the operational state (i.e., whether the selected electrical devices 14 will be ON or OFF) for each of the periods 146. FIG. 8C shows an exemplary UI screen for step 206, which uses a toggle mechanism for each smart plug 16. When complete, the method advances to step 212.

At step 208, the user selects which day(s) of the week will be included in the device program 144. FIG. 8D shows an exemplary screen for step 208. When complete, the method advances to step 208.

At step 210, the user can create a number of device periods 146. FIG. 8E shows an exemplary screen for step 210. When complete, the method now advances to step 206 to define the operational state of the selected plugs. However, when following an unlinked schedule, these device periods 146 are not associated with a predefined state or activity (Asleep, Awake, etc.), but will simply be labelled ON or OFF, corresponding to their defined operational state.

At step 212, the device scheduling program is shown in graphic format illustrating when the electrical devices 14 are ON or OFF. FIG. 8F shows an exemplary screen for step 212. At this point, the method for setting up a linked or unlinked Device scheduling program 144 is complete.

While the above method for programming a device scheduling program only shows binary ON/OFF options for the electrical devices 14, those of skill in the art will recognize that other operational states for the electrical devices 14, such as duty cycle or time percentages or set points, could be implemented similar manner.

It is contemplated that users may wish to modify their existing Scheduling programs 106 and/or device programs 144 in response to changing energy prices provided by their utility 88. Changing energy prices can include dynamic pricing, time-of-use (TOU) pricing and/or demand response (DR) events. TOU pricing (as defined by the utility 88) can be transmitted to controller 22 either directly or via environmental web portal 26, as discussed above. With dynamic pricing, electrical rates can change based upon current demand, but not according to predetermined, fixed periods. With TOU pricing, electrical rates move between fixed pricing tiers at fixed intervals based upon the time of day and/or day of the week. TOU pricing includes a tier schedule (i.e., the start and end times of each pricing tier) and tier prices (i.e., the electrical rate charge for each pricing tier). In the currently-illustrated embodiment, TOU pricing information such as the tier schedule and the tier prices can be displayed by the user using the energy use program 100. Furthermore, during the regular operation of controller 22, the current pricing tier and tier price is displayed on touch screen display 40.

TOU tier schedules and tier prices can be provided to controller 22 directly from utility 88 or through the environmental web portal 26. Alternatively, users can manually input a tier schedule and tier prices using energy use program 100 (FIG. 2). When tier schedules and tier pricing data is available to controller 22, the user will be able to adjust the temperature in each usage or device period for the duration of the various price tiers.

At a basic level, users will be able adjust their temperature set points and device states (ON/OFF, etc) based upon the pricing tier or the dynamic price. For example, the user could create different temperature set points in the Scheduling program 106 for the "Awake" period 114, one for each of the Low, Medium and High price tiers. By default, the normal Scheduling program 106 would be the defaults to the set points for the low price tier. As with the normal, non-TOU Scheduling program 106, the temperature set points can be adjusted for both the heat and cool modes. When changes are made to the temperature set points based upon TOU pricing, then preheating and cooling is typically be disabled by controller 22.

For Device scheduling program 144, the user could set the device period 146B to be ON for the low price tier, and OFF for the Medium and High price tiers. tiers. By default, the normal Device scheduling program 144 would be the default schedule for the low price tier. As with the normal, non-TOU Device scheduling program 144, the operating state for each period 146 can be adjusted for both the heat and cool modes.

On the home screen, during a TOU price adjustment, the user will see the adjusted operating state. As well the program button will be replaced by the resume button. As well in the text field (below Heat, Auto etc) notification of the current price tier will be displayed (High, Med., Low). If a manual adjustment of the temperature set point is requested by the user, or if the user presses the Resume button, then a warning message will appear on the touch screen display 40 to verify whether the user wishes to cancel the TOU override.

It is contemplated that the method described above will not always appeal to users, and in some cases, more granular control is desired. Referring now to FIG. 13, a method to program Scheduling programs 106 using tiered TOU pricing is shown, beginning at step 300. At step 300, a user enables TOU scheduling option using the energy use program 100.

At step 302, the user selects the Scheduling program 106 (illustrated in FIG. 10). Alternatively, controller 22 could automatically bring up the Scheduling program 106. With the TOU scheduling option enabled, the controller displays pricing tier overlays 120 onscreen for the different pricing tiers being shown (FIG. 10). In the example illustrated in FIG. 10, the utility 88 has defined 9 PM-7 AM as low price tier 122; 7 AM to 9 AM and 7 PM to 9 PM are both defined as mid price tier 124; and 9 AM to 7 PM is defined as high price tier 125.

At step 304, the Scheduling program 106 automatically creates new usage periods 114 based upon where the pricing tier overlays 120 bisect existing usage periods 114. For example, in the scheduling program shown in FIG. 10, usage period 114A ("Awake") is unchanged as it falls entirely within the low price tier 122. In contrast, usage period 114B ("Away") is divided into new usage periods 114B-1 (mid price tier 124) and 114B-2 (high price tier 125). Usage period 114C ("Home") crosses all three rate tiers and is thus split into new usage periods 114C-1 (low price tier 122), 114C-2 (mid price tier 124), and 114C-3 (high price tier 125) and 114C-4 (mid price tier 124). Usage period 114D ("Asleep) is divided into two new usage periods 114D-1 (low price tier 122) and 114D-2 (mid price tier 124).

When the different usage periods are color coded (blue, orange, green, etc.), it is contemplated that the Scheduling program 106 may use subtle variations in the colour to indicate the pricing tier for each of the new usage periods 114. In the currently-illustrated example, usage period 114C-1 could be a light orange (indicating that it falls within the low pricing tier 122), usage periods 114C-2 and 114C-4 could be a midtone orange (mid price tier 124), and usage period 114C-3 could be a dark orange (high price tier 125). Other coloring schemes to indicate different pricing tiers will occur to those of skill in the art.

By default, the temperature set points for each of the new usage periods 114 defaults to the temperature set point of the old temperature set point. Alternatively, the temperature set points for each off the new usage periods 114 can be offset from the old temperature offset by a fixed (or user-adjusted) amount, or be set to a new, fixed temperature value.

At step 306, the user can manually adjust the temperature set points for each of the new or old usage periods 114. The method of manually-changing the temperature set point is not particularly limited. For example, on the controller 22, simply by touching the new usage period 114 using the touch screen display 40 the user can bring up set point adjustment indicia, slider, buttons, toggles, etc. (not shown). Alternatively, a set point adjustment window could be displayed onscreen (also not shown). if the user is interacting with the Scheduling program 106 using a personal computer 72, then selection of a usage period 114 is typically made with a mouse or other pointing device. When finished, the user simply exits the Scheduling program 106.

It is contemplated that TOU price scheduling can also be enabled when the user creates a Scheduling program 106 using the wizard 118. In such a case, the user will create a Scheduling program 106 (using the Editor 116 or the Wizard 118) having usage periods 114 that correspond to their natural behaviours and activities. If the user enables TOU price scheduling (or if it is already enabled), then the Scheduling program 106 will automatically subdivide the usage periods 114 into new usage periods. The user will then be able to manually adjust the newly-created usage periods in the manner described above.

While the aforementioned method and example illustrates the implementation of TOU price scheduling for the Scheduling program 106, it will be apparent that such a method can also be implemented for the Device scheduling program 144. When TOU price scheduling is implemented, the device periods 146 are also subdivided based upon their bisection by the pricing tier overlays 120. The operating state (e.., ON/OFF) associated with each device period 146 can then be subsequently manually adjusted. If Device scheduling program 144 is linked to Scheduling program 106 (as is described above), then the Device scheduling program 144 will automatically implement TOU price scheduling and subdivide the existing device periods 146.

Although an HVAC Controller with a Device Scheduler as been used to establish a context for disclosure herein, it is contemplated as having wider applicability. Furthermore, the disclosure herein has been described with reference to specific embodiments; however, varying modifications thereof will be apparent to those skilled in the art without departing from the scope of the invention as defined by the appended claims.

What is claimed is:

1. A controller for operating HVAC equipment on a premise, the controller having a processor, memory, and a RF module for communication with a home automation network, wherein
   the controller being adapted to regulate operation of the HVAC equipment based upon a scheduling program created by a user and stored in memory, the scheduling program including at least one usage period and at least one set point associated with each usage period;
   the controller being adapted to regulate operation of at least one electrical device over the home automation network;
   the controller being further adapted to create a device scheduling program for each electrical device of the at least one electrical devices, the device scheduling program including at least one device period and an operational state associated with each at least one device period; and
   wherein the controller prompts the user to select between a linked device scheduling program in which the controller links the device scheduling program to the scheduling program for the HVAC equipment so that the at least one device period of the device scheduling program automatically correspond to the at least one usage period of the scheduling program and an unlinked device scheduling program in which the user configures the at least one device period of the device scheduling program for the at least one electrical device.

2. The controller of claim 1, wherein changing one of the at least one device periods and the at least one usage periods changes the other of the at least one device periods and the at least one usage periods.

3. The controller of claim 1, wherein the each device period of the at least one device periods being associated with the electrical devices has an operational state of ON or OFF.

4. The controller of claim 1, wherein the controller automatically queries the user to create the device scheduling program upon detection of a new electrical device within the home automation network.

5. The controller of claim 1, wherein the controller is operable to communicate with a remote device across a wireless network so that the remote device can configure and program the electrical device on the home automation network.

6. The controller of claim 1, wherein the user can program the device scheduling program for more than one electrical device concurrently using the controller.

7. The controller of claim 1, wherein each device scheduling program can include an option to allow the device's operational state to be modified during a demand response event received by the controller from a utility.

8. The controller of claim 1, wherein the controller includes separate device scheduling programs each electrical device for when the controller is in Heat mode and when the controller is in Cool mode.

9. The controller of claim 1, wherein the scheduling program may be temporarily overridden by vacation overrides stored in the memory of the controller, and the device scheduling program is similarly overridden by the vacation overrides.

10. The controller of claim 1, wherein the device scheduling program may be temporarily overridden by an override requested by the user, the length of the override being configured in a Preferences menu of the controller.

11. The controller of claim 1, wherein the controller can display the current operational state of the at least one electrical device to the user outside of the device scheduling program.

12. The controller of claim 1, wherein the controller can display the instantaneous electrical consumption of the at least one electrical device.

13. The controller of claim 1, wherein the controller can display the cumulative electrical consumption of the at least one electrical device.

14. The controller of claim 1, wherein the controller can display electrical pricing information for the at least one electrical device, the electrical pricing information being supplied by a utility.

15. The controller of claim 1, wherein the controller can display electrical pricing information for the at least one electrical device, the electrical pricing information being inputted by the user and stored in the memory of the controller.

* * * * *